Patented Aug. 12, 1941

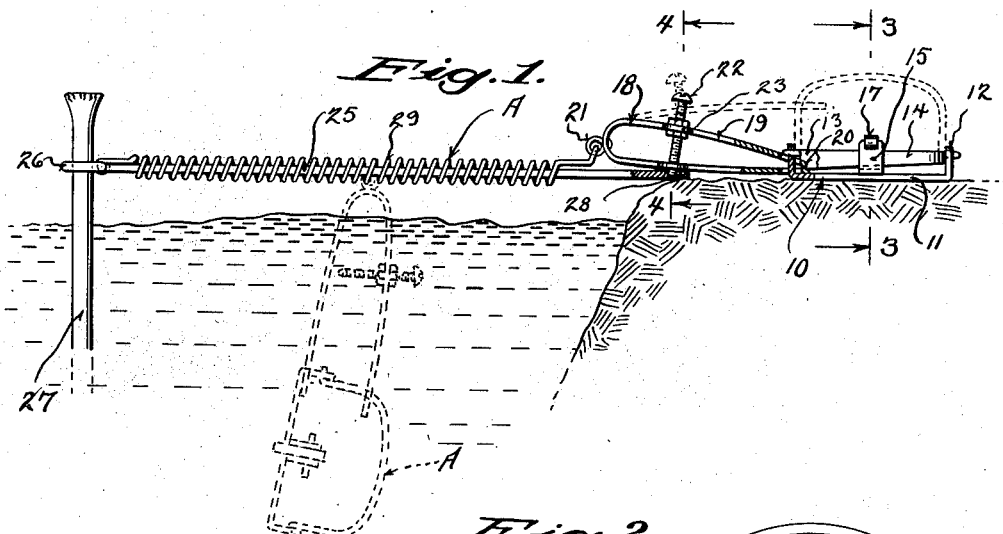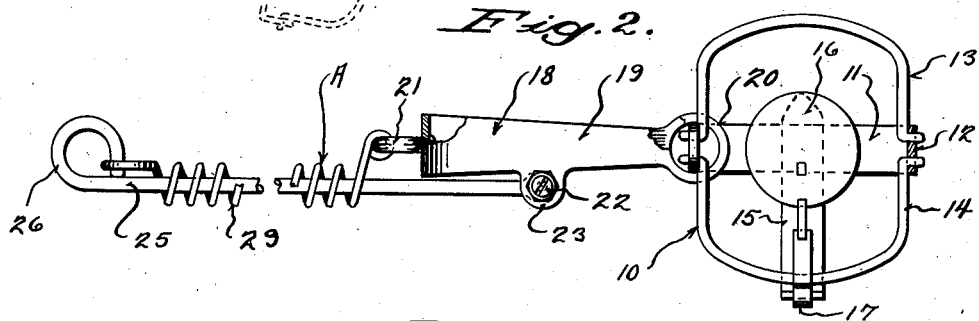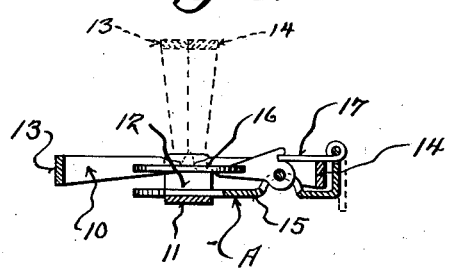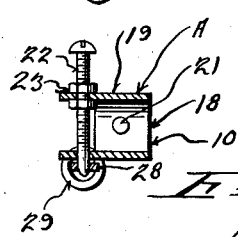

2,252,405

UNITED STATES PATENT OFFICE 2,252,405

ANIMAL TRAPPING DEVICE

Leo F. Navin, Hartland, Wis.

Application March 15, 1940, Serial No. 324,137

3 Claims. (Cl. 43—96)

This invention appertains to trapping, and more particularly to a novel device for anchoring a trap in a predetermined manner.

One of the primary objects of my invention is to provide means for facilitating the trapping of an animal which inhabits the banks of rivers and streams (such as muskrats), so that upon the operation of the trap, the captured animal will be prevented from releasing himself by gnawing off the caught paw or leg.

Another salient object of my invention is to provide means, after the operation of the trap by the animal, for forcibly jerking the entire trap with the caught animal in the water, so as to prevent the animal from further injuring himself and to bring about the prompt drowning of the animal.

A further important object of my invention is the provision of means for anchoring a trap to a post embedded in the bed of a river or stream in such a manner that the trap can be set on the bank of the river or stream. The anchoring means between the trap and stake is such that upon operation of the trap by the animal, the entire trap and the caught animal will be instantaneously pulled toward the stake and into the river or stream.

A still further object of my invention is the provision of means actuated by the jaw spring for the trap for releasing the trap from a rigid supporting arm, so that the tension of a coil spring can be brought into action for quickly jerking a trap and caught animal toward a stake embedded in a stream.

A still further important object of my invention is to provide a novel trap-anchoring device of the above character, which will be durable and efficient in use, one that will be simple and easy to manufacture and one which can be associated with jaw traps at a small cost.

With these and other objects in view, the invention consists in the novel construction, arrangement and formation of parts, as will be hereinafter more specifically described, claimed, and illustrated in the accompanying drawing, in which drawing:

Figure 1 is a side elevational view of my improved mechanism, showing the trap set and positioned on the bank of a river or other stream for operation by an animal, parts of the trap and associate mechanism being shown broken away and in section.

Figure 2 is a top plan view of my novel trapping device, with parts thereof broken away and in section.

Figure 3 is a vertical sectional view through the trap, taken on the line 3—3 of Figure 1, looking in the direction of the arrows.

Figure 4 is a detail, transverse, sectional view of the trap, taken on the line 4—4 of Figure 1, looking in the direction of the arrows.

Figure 5 is a fragmentary, top plan view of the outer end of the rigid bar or strap employed for releasably connecting the stake and trap together.

Referring to the drawing in detail, wherein similar reference characters designate corresponding parts throughout the several views, the letter A generally indicates my novel trapping appliance, and the same includes a jaw trap 10 of substantially ordinary construction.

Thus, the trap includes the longitudinally extending body 11 having the upstanding ears 12 to which are pivotally connected the trap jaws 13 and 14. Secured to the body plate 11 is the right-angularly extending supporting bracket 15, and this bracket has rockably connected thereto the bait pan 16 for releasably engaging the trip trigger 17. The jaws 13 and 14 are normally urged toward one another by the relatively heavy U-shaped leaf spring 18. The legs 19 of the spring terminate in enlarged eyes 20 for receiving certain legs of the jaws 13 and 14 and for normally fitting over one ear 12 of the body plate.

Upon actuation of the bait pan 16 by an animal, the trip trigger 17 will be released, and this will allow the jaws 13 and 14 to be forcibly brought together by the leaf spring 18 in the ordinary way. The bight portion of the leaf spring 18 has connected therewith a swivel eye 21.

The trap, so far described and illustrated, is of substantially the ordinary construction, as brought out above, but, in accordance with my invention, the upper arm 19 of the leaf spring 18 carries a depending screw 22, which constitutes a releasable holding trigger, as will be later described. The screw 22 can be adjusted up or down on the uppermost arm of the leaf spring, and the lowermost arm of the leaf spring is provided with an opening through which the lower end of the trigger screw 22 is adapted to loosely extend. I prefer to provide the edges of the arms 19 of the leaf spring with outwardly and laterally extending lips 23 for receiving the screw 22.

My novel means for anchoring the trap in a predetermined position embodies an arm 25, which may consist of a rigid rod or similar appliance, and this rod has formed on its rear end a closed loop 26 for engaging about a stake 27. This stake 27 is adapted to be driven into the bed of a river or stream a predetermined distance from the bank of the river or stream. The forward end of the rod 25 can terminate in a flattened eye 28 which constitutes a keeper for releasably receiving the extreme lower end of the screw 22, as will be hereinafter also more fully described.

Placed about the rod 25 is a relatively heavy contractile coil spring 29, and one end of this spring is firmly anchored to the loop 26, and the other end of the spring is firmly secured to the swivel eye 21 carried by the trap.

In operation of my appliance, the jaws 13 and 14 of the trap are spread open in the usual way until the eyes 20 of the spring 18 ride over the adjacent ear 12 of the body plate 11. The trigger release 17 is swung over the jaw 14, and the bait pan 16 is raised so as to engage the trigger release. The trap is now in set condition and the pan 16 can be loaded with the desired character of bait.

With the depressing of the spring, the lower end of the screw 22 can be extended through the lower lip carried by the lower arm of the spring, and into the flattened eye 28 of the rod 25, and the trap can be laid upon the bank of a stream. The spring 29 will be stretched a relatively great distance when the trap is moved to the end of the rod, and the trap is prevented from being drawn forcibly back toward the stake 27 and into the water by the engagement of the lower end of the screw in the eye 28.

When the trap is operated by an animal by the depressing of the bait pan 16, the jaws 13 and 14 will instantly snap together and catch the animal's paw or leg. Instantaneous with this operation, the lower end of the screw 22 will be drawn upwardly by the topmost leg 19 of the spring 18, and, hence, the screw will be moved out of the eye 28 of the rigid rod 25.

As soon as the screw is moved out of the eye, the spring 29 will be immediately brought into play, and this spring will forcibly snap the trap and the captured animal toward the stake and into the water. This will prevent the animal from gnawing off his caught paw or leg, and the animal will be quickly drowned.

While in Figure 1 I have shown the trap pulled back along the rod 25 and suspended from the rod, in actual practice, the rod is usually pulled off the bank and into the water with the trap. This is either caused by the snap action of the spring 29 or by the movements of the animal after it has been caught.

Changes in details may be made without departing from the spirit or the scope of my invention, but what I claim as new is:

1. In an animal trapping device, a jaw trap, a rigidly anchored member, means rigidly holding the trap spaced from the anchored member upon the setting of the trap, and means set in operation by the actuation of the trap by an animal for forcibly moving the trap and the captured animal toward the anchor.

2. In an animal trapping device, a jaw trap, means for normally moving the jaws of the trap toward one another, including a leaf spring having superimposed arms, the arms being movable toward one another when the jaws of the trap are open, and away from one another when the jaws are closed and the trap is in its sprung condition, an anchor, a rigid rod connected with the anchor, having a keeper adjacent its forward end, spring means connecting the trap and anchor for normally urging the trap toward the anchor, and a trigger member carried by the uppermost arm of the leaf spring for engaging the keeper when the trap is in its set position for holding the trap at the forward end of the rod and spaced from the anchor against the tension of said spring means, the trigger being moved from the keeper by the action of the leaf spring upon the operation of the trap.

3. In a trapping device, a jaw trap including pivoted jaws, a U-shaped leaf spring including superimposed arms engaging the jaws for normally moving the jaws toward one another, the arms of the leaf spring being movable away from one another to spring the jaws of the trap toward one another, a stake, a rigid rod secured to the stake and extending radially therefrom having a keeper adjacent its forward end, a contractile spring coiled about said rod and having one end anchored to the stake and its opposite end to the trap, the spring normally tending to pull the trap along the rod to the stake, and an adjustable screw carried by one arm of the leaf spring movable into the keeper of the rod to hold the trap at the forward end of the rod against the tension of the coil spring, when the trap is in its set condition, the screw being movable out of engagement with the keeper upon the springing of the trap.

LEO F. NAVIN.